United States Patent Office 3,385,803
Patented May 28, 1968

3,385,803
POLYURETHANE FOAMS AND PROCESS
FOR THEIR PRODUCTION
Bernard Rabussier, Poitiers, France, assignor to
Societe Elekal, Paris, France
No Drawing. Filed Nov. 12, 1964, Ser. No. 410,785
Claims priority, application France, Jan. 2, 1964,
959,151; Patent 1,388,971
5 Claims. (Cl. 260—2.5)

ABSTRACT OF THE DISCLOSURE

Polyurethane foam prepared from a polyether and an organic polyisocyanate. The polyether itself being a polyoxyalkylene adduct of the sorbitan monoester of a fatty acid, said foam being characterized by improved hydrophilic properties.

---

This invention relates to polyurethane foams having certain special properties. This invention also relates to the process of preparation of these foams.

It is known that the polyurethane foams at present available are completely non-absorbent, and in general are water-repellent. This feature involves a serious drawback because it restricts their range of use. Polyurethane foams can form valuable artificial sponges, but their water-repellent nature prevents them for being used for ordinary cleaning purposes, because they do not make it possible to sponge a moist surface by simple contact.

Various chemical treatments have already been proposed the object of which is to render absorbent the polyurethane foams which are obtained by the reaction of polyethers or polyesters with di-isocyanates in the presence of catalysts and small quantities of water. These treatments to which the previously produced foam is subjected are not however very effective and to carry them out increases the cost of production of the foam.

The improved foams in accordance with the invention are intended to overcome these drawbacks. They have, from their production onwards, a noteworthy and persistent absorbent nature.

According to the present invention the polyurethane foam, the constituent material of which comprises the products of polyaddition of a polyether and an organic poly-isocyanate, the polyether itself generally comprising alkylene oxide polyadditioned to a polyol of the group of diols and triols is principally characterised in that the material of the foam also comprises the products of polyaddition with the poly-isocyanate, of a polyoxyethylenated sorbitan monoester of a fatty acid.

Experience has in fact shown that the above-mentioned polyurethane foams have a stable constitution which is not hydrosoluble and offers remarkable absorbent properties.

The foam can thus be used as it is to form synthetic sponges or can be associated with other fibres to form absorbent tissues.

The invention also covers the process of production of the foams in question. This process which comprises a polyaddition reaction of a polyether and an organic poly-isocyanate in the presence of water and catalysts is characterised in that a polyoxyethylenated sorbitan monoester of a fatty acid is added to the reaction mass.

The constituent features of the foams in accordance with the invention will now be described in detail and also the process of production relating to them.

The polyether which is used is one of the polyethers commonly used in the production of flexible foams of non-absorbent polyurethane, and which are generally the products of polyaddition of an alkylene oxide to a diol or a triol. Such polyethers have a molecular weight between 1,500 and 5,000.

For instance there may be taken the product resulting from the polyaddition of propylene oxide with glycerol, whose molecular weight is substantially between 2,500 and 3,000 (the values commonly adopted for flexible foams).

The organic poly-isocyanate which it is intended, in accordance with a technique well-known per se, to react with the above polyether can be formed particularly from a mixture of tolylene di-isocyanate-2,4 and tolylene di-isocyanate-2,6 in which the content of 2-4 isomer is between 65 and 90% and preferably 80%.

The formula for these two latter agents is referred to for greater clarity respectively at (I) and (II) in the table of formulae given below.

By sorbitan (or sorbitane) is designated the complex product constituted by the anhydride of sorbitol and resulting from the dehydration of sorbitol. This complex contains principally, in varying proportions, the following substances whose developed formulae are shown in the table formulae given later:

Hydroxymethyl-2 trihydroxy-3,4,5 tetrahydropyran (Formula III)
Dihydroxyethyl-2 dihydroxy-3,4 tetrahydrofuran (Formula IV)
Bis-(hydroxymethyl)-2,5 dihydroxy-3,4 tetrahydrofuran (Formula V)

By sorbitan monoester we mean a product arising from the esterification of hydroxy groups of the above constituents by a saturated or unsaturated fatty monoacid, at the rate of 0.8 to 1.2 molecule-grams of sorbitan per gram-molecule of fatty monoacid. In particular this monoacid may contain from 8 to 18 atoms of carbon and may comprise, for instance, lauric, palmitic, oleic or stearic acids.

Thus, in the case when lauric acid is used, the product termed "sorbitan monolaurate" is a complex product containing in great part the monolaurates of the tetrahydropyrannic and tetrahydrofurannic polyols contained in sorbitan (Formulae III to V) and also non-esterified polyols and their dilaurates and trilaurates because it is not a question of a completely selective esterification.

The absorbent agent whose use is provided by the invention, the polyoxyethylenated sorbitan monoester of a fatty acid, is thus the product which results from the addition of a certain number of molecules of ethylene oxide to a fatty acid monoester of sorbitan, as described above.

In the table of formulae at VI, VII and VIII are represented the polyoxyethylenated monesters of the tetrahydropyranic and tetrahydrofuranic polyols III to V above. In these formulae R is the hydrocarbon aliphatic chain of the fatty acid and $p$, $q$, $r$ are whole numbers representing the number of molecules of ethylene oxide.

According to a preferred embodiment of the invention the polyoxyethylenated sorbitan monoester which is used to produce absorbent polyurethane foam should have a total number of ethylene oxides ($p+q+r$) preferably between 15 and 50.

On the other hand the amount of polyoxyethylenated sorbitan monoester to be used is advantageously between 10 and 60 parts per 100 parts of ordinary polyether. The polyether, in turn, is present in an amount about 1.4 to about 2 parts by weight per part by weight of polyisocyanate, as will be seen from the examples hereinafter.

It must be emphasized that the absorbent polyurethane foams in accordance with the invention correspond to a true combination of the derivative of polyoxyethylenated sorbitan with the radical of the longchain polymer molecule, so that this derivative is locked in the molecule and there is no danger of seeing it dissolve in the water. The absorbent nature of the foam is in fact bound up with the presence of polyoxyethylenated sorbitan in the constitution of the molecule.

An attempt might be made to explain thus a posteriori the reactions brought into play by the addition of the polyoxythylenated sorbitan monoester; this latter reacts by its free hydroxyl groups with the di-isocyante in accordance with a polyaddition reaction.

The final polymer obtained comprises, in its complex molecular network, absorbent sequences of the type of those shown diagrammatically at (IX) (X) and (XI) in the table of formulae.

In these formulae R always designates the hydrocarbon aliphatic chain of the fatty acid of the derivative of sorbitan.

The three NCO groups still free at the derivatives (IX), (X) and (XI) react in turn either with a molecule of water or with one of the hydroxyl groups of the polyether, or with one of the hydroxyl groups of a new molecule of a polyoxethylenated sorbitan monoester. The reaction continues in this way, the sorbitan derivative entering into the constitution of the high polymer thus formed. The absorbent compound which enters into the composition of the foams in accordance with the invention forms an integral part of the polymer and cannot therefore be extracted from it by water or by a solvent as would be the case in dealing with the production of mixtures or with absorption phenomena.

Of course, in addition to the preceding essential agents, the constitution of the foam may also include additives, for example pigments and anti-oxidizing agents.

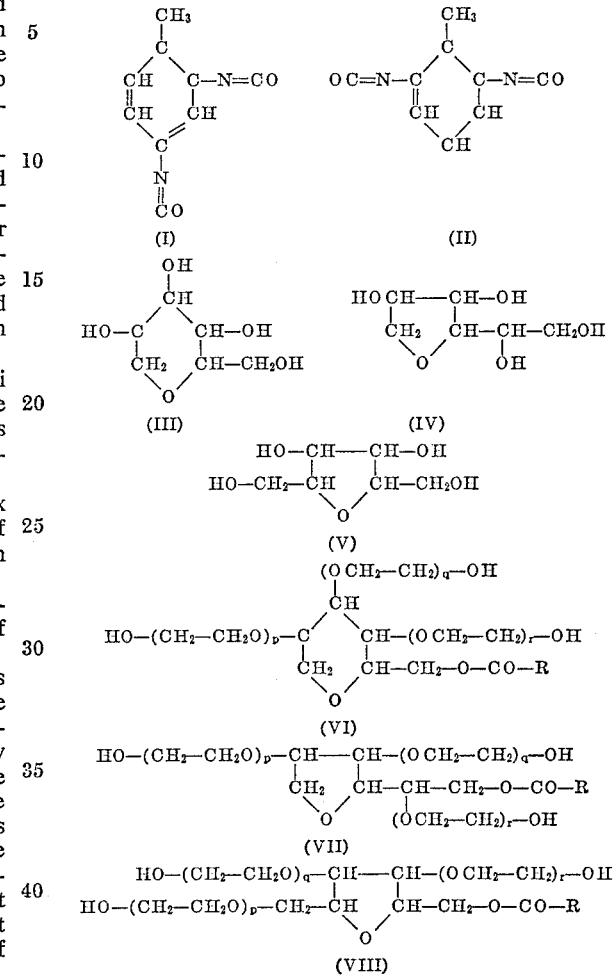

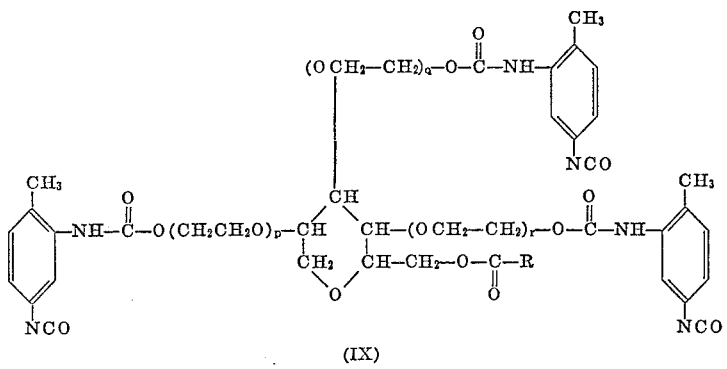

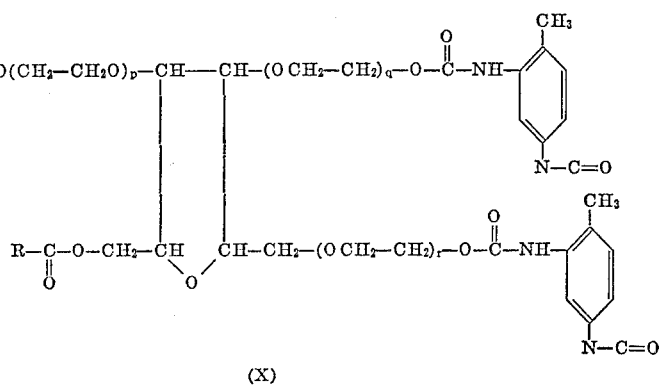

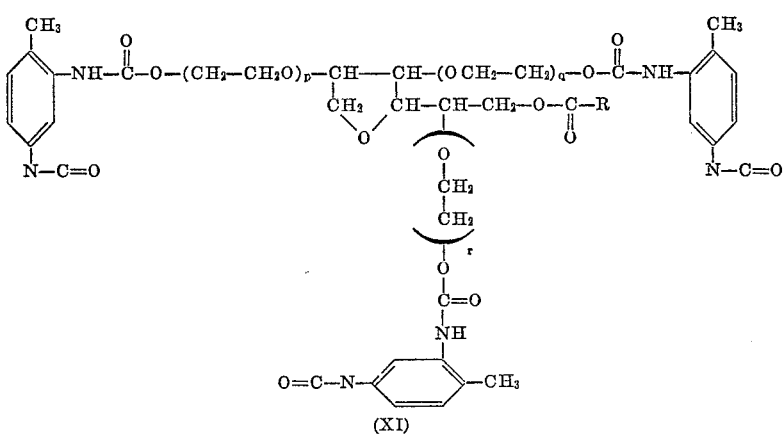

(XI)

To carry out the process in accordance with the invention the quantity of di-isocyanate to be used is calculated starting from the quantity of water introduced and the quantity of hydroxyl groups, as in the case of ordinary polyurethane foams; the hydroxyl index to be taken into consideration in the case of the invention being that of the mixture (polyether+polyoxyethylenated sorbitan monoester). By hydroxyl index we mean, as is well known, a coefficient proportional to the number of groups of hydroxyls and inversely proportional to the molecular weight.

The proportions of the polyoxyethylenated sorbitan monoester to be used have been indicated above in connection with the constitution of the foams.

The water which is used in the production of absorbent polyurethane foam plays the same part as in the production of a conventional polyether foam. Its primary function is to produce carbolic anhydride by reaction with the di-isocyanate in accordance with the equation:

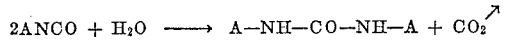

Its second function is to make an important contribution to the mechanical characteristics of the foam following the formation of polyureas and the secondary reactions deriving from this.

The catalysts which are used are the same as those used for the production of non-absorbent polyurethane foams. It is a question of a tertiary amine and an organo-metallic product.

As tertiary amine there may be used for instance: diaza-dycyclo-2,2,2 octane, dimethyl benzylamine, tributyl amine, triethyl amine, N-methyl morpholine, N-methyl pyrrole, N-methyl pyrrolidine or diethyl aminoethanol. As organo-metallic products there may be mentioned the dilaurate of dibutyl tin, tin octoate, lead octoate and lead naphthenate.

For the preparation of absorbent polyurethane foams in accordance with the invention, it is necesary to add to the mixture, as is the case with ordinary polyurethane foams, water-soluble silicone oils consisting of siloxane-oxyalkylene copolymers, the object of which is to facilitate the mixing of the ingredients and to stabilize the foam during its formation. These silicone oils are the well-known copolymers ordinarily used with polyurethane foams.

There are further added to the preceding constituents, the additives defined above and there may be also incorporated a flowing agent such as trichlorofluoromethane.

The foams thus produced are of the type with open cells of uniform dimensions. If it is desired to produce cells with different dimensions, it is also possible, in a known manner, to add certain agents of the silicone, paraffin wax or stearic acid families.

In carrying out the process in accordance with the invention in practice, itis advantageous to first mix the polyether, the polyoxyethylenated sorbitan monoester and the organo-metallic catalyst.

The water-soluble silicone oil and the tertiary amine are mixed separately in the reaction water.

The second mixture is then poured into the first while stirring and the polyisocyanate added and also any other ingredients which may have been used, after which the whole is cast in moulds.

Example 1

In a four litre stainless steel container are mixed:

(a) 300 g. of sorbitan mono-oleate with 20 mols ethylene oxide.
700 g. polyether resulting from the addition of propyleneoxide to the glycerol and having a mean molecular weight of 3,000.
2.5 g. of tin dibutyl dilaurate.

In a 100 cc. stainless steel container are mixed:

(b) 40 g. water.
7.5 g. water-soluble silicone oil consisting of a siloxane-oxyalkylene polymer.
10 g. N-methyl pyrrole.

(c) In the middle of the container holding the mixture: (a) is fitted a turbine with a diameter of 55 mm. rotating at a speed of 2,000 to 2,500 r.p.m.

The mixture (b) is poured, and then rapidly 503 g. tolylene di-isocyanate. Stirring is continued for a further 35 seconds after the addition of the tolylene di-isocyanate, then the foam which commences to form is poured immediately into a 50 litre mould. 12 hours after pouring the block can be removed from the mould and cut into sponges. These have a good adsorbent power in respect of water as shown by the table which follows the examples.

The sponges obtained are more supple and pleasant to the touch.

In the following examples only the composition is given, the material and mode of operation being similar to those in Example 1.

Example 2

(a) 100 g. sorbitan monolaurate with 40 mols ethylene oxide
900 g. polypropylene glycol having a mean molecular weight of 2,000
3 g. tin octate (b) 36 g. water
15 g. water-soluble silicon oil consisting of a siloxane-oxyalkylene copolymer
1.2 g. of diazo dicyclo-2,2,2-octane (c) 460 g. tolylene di-isocyanate Duration of stirring after addition of (c): 18 seconds.

Example 3

(a) 300 g. of sorbitan monopalmite with 30 mols ethylene oxide 700 g. polyether resulting from the addition of propylene oxide to glycerol and having a molecular weight of 3,000
3 g. tin octoate
(b) 35 g. water
30 g. water-soluble silicone oil consisting of a siloxane-oxyalkylene copolymer
0.5 g. diazadicyclo-2,2,2-octane.
(c) 445 g. tolylene di-isocyanate Duration of stirring after addition of (c): 35 seconds.

Example 4

(a) 300 g. of sorbitan mono-oleate with 20 mols of ethylene oxide
700 g. of polyether resulting from the addition of propylene oxide to glycerol and having a molecular weight of 3,000
2.5 g. of tin dibutyl dilaurate
(b) 40 g. water
10 g. water-soluble silicone oil consisting of a siloxane-oxyalkylene copolymer
8 g. N-methylpyrrole
(c) 505 g. tolylene di-isocyanate Duration of stirring after addition of (c):31 seconds.

Example 5

(a) 100 g. sorbitan monolaurate with 40 mols ethylene oxide
900 g. polyether resulting from the successive additions of propylene oxide and ethylene oxide to glycerol and having a molecular weight of 3,500
3 g. tin octoate
(b) 45 g. water
15 g. water-soluble silicone oil consisting of a siloxane-oxyalkylene copolymer
1.2 g. of diazadicyclo-2,2,2-octane
(c) 535 g. tolylene di-isocyanate Duration of stirring of addition of (c): 17 seconds.

Example 6

(a) 100 g. of sorbitan monolaurate with 40 mols ethylene oxide
450 g. of the same polyether as in Example 2
450 g. of the same polyether as in Example 3
3 g. tin octoate
(b) 36 g. water
15 g. water-soluble silicone oil consisting of a siloxane-oxyalkylene copolymer
1.2 g. of diazadicyclo-2,2,2-octane
(c) 460 g. of tolylene di-isocyanate Duration of stirring after addition of (c): 18 seconds.

Example 7

(a) 200 g. of sorbitan monolaurate with 40 mols ethylene oxide
800 g. of the same polyether as in Example 5
5 g. tin octoate
(b) 35 g. water
25 g. water-soluble silicone oil consisting of a siloxane-oxyalkylene copolymer
1 g. of diazadicyclo-2,2,2-octane
(c) 422 g. tolylene di-isocyanate Duration of stirring after addition of (c): 15 seconds.

To check the absorbency of the synthetic sponges obtained by the process in accordance with the invention, a test is made consisting of measuring the quantity of water which is absorbed by a sample of given dimensions placed on a thin layer of water maintained in a constant level. A test sponge 10 x 3 x 3 cc. which is moistened and then dried thoroughly is placed on a Petri dish, the bottom of which is covered with a layer of water 1 cm. deep. The level of the water is kept constant in spite of its rise in the sponge by adding water from a burette. The quantity of water thus added is expressed in g. per sq. dm. and characterises the absorbency of the sponge.

The figures obtained for the different kinds of sponge produced in accordance with the compositions in the Examples 1 to 7 are given in the following table.

| Sponges: | Absorbency |
|---|---|
| Polyurethane sponge in accordance with the invention | |
| Example 1 | 66 |
| Example 2 | 44 |
| Example 3 | 60 |
| Example 4 | 55 |
| Example 5 | 50 |
| Example 6 | 50 |
| Example 7 | 60 |
| Ordinary polyurethane sponge | 0 |

What I claim is:

1. A hydrophilic polyurethane foam obtained by the process comprising reacting in the presence of a catalyst and a blowing agent, an organic polyisocyanate with a polyether comprising a propylene oxide adduct of a polyol selected from the group consisting of a diol and a triol and having a molecular weight between about 1500 and about 5000 and with a polyoxyethylenated sorbitan monoester of a fatty acid having 8 to 18 carbon atoms, said monester being present in an amount about 10 to about 60 parts by weight per 100 parts by weight of said polyether, said polyether being present in an amount about 1.4 to about 2 parts by weight per part by weight of polyisocyanate.

2. A foam as claimed in claim 1, said monoester being obtained by a process in which a mixture of the following three polyols:

hydroxymethyl-2 trihydroxy-3,4,5 tetrahydropyran,
dihydroxyethyl-2 dihydroxy-3,4 tetrahydrofuran,
bis-(hydroxymethyl)-2,5 dihydroxy-3,4 tetrahydrofuran is reacted with said fatty acid to form a monoester, after which said monoester is polyoxyethylenated.

3. A foam as claimed in claim 2, in which said monoester contains 15 to 50 mols of ethylene oxide per mol of monoester.

4. A foam as claimed in claim 1, in which said monoester contains 15 to 50 mols of ethylene oxide per mol of monoester.

5. A foam as claimed in claim 1, in which said polyisocyanate is mixed in one shot with a mixture of the other claimed components.

References Cited

UNITED STATES PATENTS

| 2,779,689 | 1/1957 | Reis | 260—2.5 |
| 2,950,262 | 8/1960 | Bush et al. | 260—2.5 |
| 2,981,700 | 4/1961 | Parker et al. | 260—2.5 |
| 3,088,922 | 5/1963 | Christenson et al. | 260—2.5 |
| 3,037,947 | 6/1962 | Elkin | 260—18 |
| 3,050,477 | 8/1962 | Gmitter et al. | 260—2.5 |
| 3,098,048 | 7/1963 | Shelanski et al. | 260—2.5 |
| 3,248,348 | 4/1966 | Piechota et al. | 260—2.5 |
| 3,248,349 | 4/1966 | Szobat et al. | 260—2.5 |

FOREIGN PATENTS

| 729,523 | 9/1952 | Great Britain. |

OTHER REFERENCES

Schwartz et al., "Surface Active Agents and Detergents," vol. II, 1958, pp. 125–132.

DONALD E. CZAJA, *Primary Examiner.*

LEON J. BERCOVITZ, *Examiner.*

J. J. KLOCKO, G. W. RAUCHFUSS,
*Assistant Examiners.*